(12) United States Patent
Pomerantz

(10) Patent No.: US 7,401,733 B2
(45) Date of Patent: Jul. 22, 2008

(54) THIN SMART CARD

(75) Inventor: Itzhak Pomerantz, Kefar Saba (IL)

(73) Assignee: SanDisk Il Ltd, Kfar Saba (IL)

( * ) Notice: Subject to any disclaimer, the term of this patent is extended or adjusted under 35 U.S.C. 154(b) by 0 days.

(21) Appl. No.: 11/530,911

(22) Filed: Sep. 12, 2006

(65) Prior Publication Data
US 2007/0057071 A1 Mar. 15, 2007

Related U.S. Application Data

(60) Provisional application No. 60/716,574, filed on Sep. 14, 2005.

(51) Int. Cl.
G06K 5/00 (2006.01)
(52) U.S. Cl. .................. 235/380; 235/449; 235/451; 235/492; 235/493
(58) Field of Classification Search ............. 235/380, 235/451, 449, 492, 493
See application file for complete search history.

(56) References Cited

U.S. PATENT DOCUMENTS

| | | | |
|---|---|---|---|
| 4,614,861 A * | 9/1986 | Pavlov et al. ............ | 235/380 |
| 5,988,511 A * | 11/1999 | Schmidt et al. ........... | 235/492 |
| 6,461,170 B1 * | 10/2002 | Oliphant et al. .......... | 439/76.1 |
| 6,839,238 B2 * | 1/2005 | Derr et al. ................ | 361/735 |
| 6,883,718 B1 * | 4/2005 | Le et al. ................... | 235/492 |
| 2006/0273154 A1 | 12/2006 | Raz Dan et al. | |

* cited by examiner

Primary Examiner—Steven S Paik
Assistant Examiner—Tuyen K Vo
(74) Attorney, Agent, or Firm—Mark M. Friedman

(57) ABSTRACT

The present invention discloses systems and methods for a smart card including: a first card having a device; and a second card having an aperture that is configured to allow a device to be inserted into an aperture when the second card is properly aligned with the first card, thereby allowing a device to protrude into an aperture. Optionally, the first card includes an aperture, and the second card includes a device, so that an aperture of the first card accommodates a device of the second card when the first card is properly aligned with the second card. Optionally, the apertures and the devices are configured to allow a stack of a plurality of the first and second cards to be densely packed Optionally, a card includes a magnetic stripe, an electronic circuit, and/or an embedded electrically-conductive wire for operationally connecting a device to a connector.

41 Claims, 7 Drawing Sheets

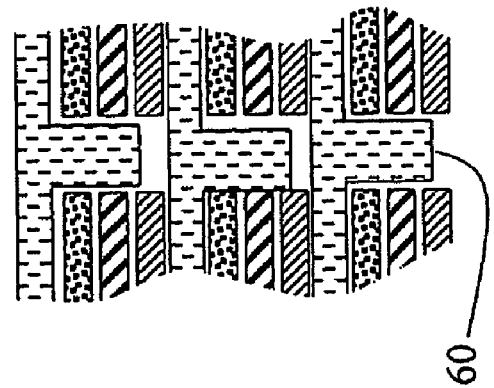
Figure 2D
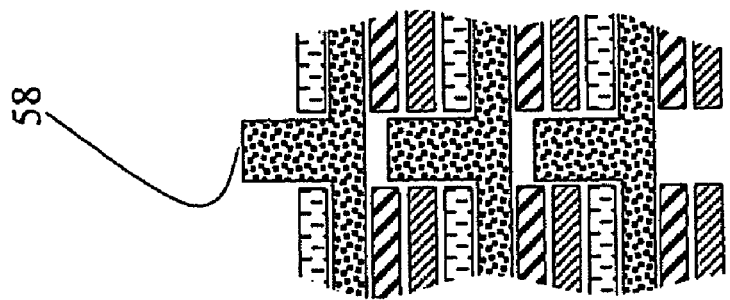
Figure 2C
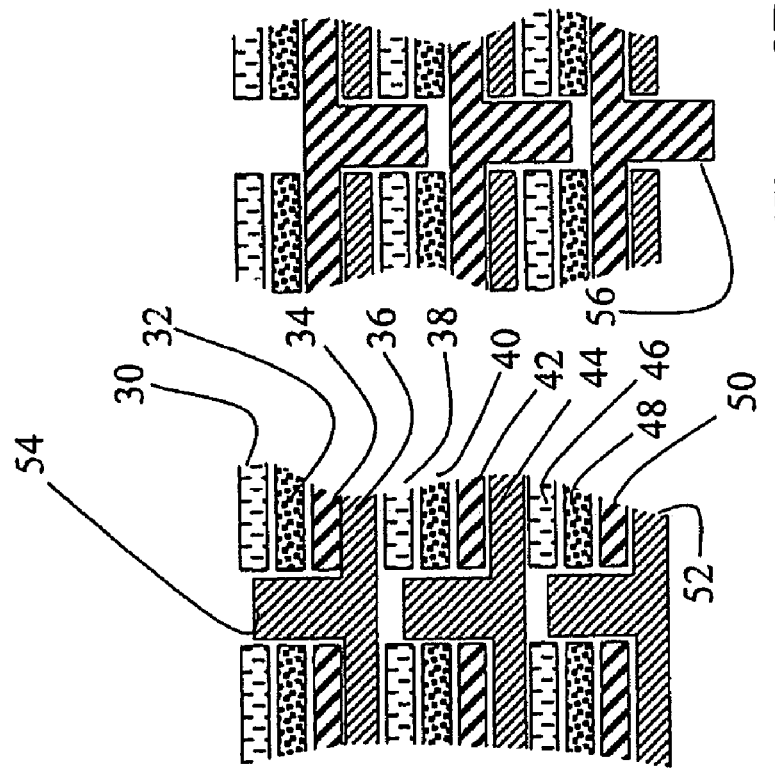
Figure 2B
Figure 2A

THIN SMART CARD This patent application claims the benefit of U.S. Provisional Patent Application No. 60/716,574 filed Sep. 14, 2005.

FIELD AND BACKGROUND OF THE INVENTION

The present invention relates to systems and methods for a smart card with embedded electronic circuitry, and for reducing the thickness of a stack of smart cards that contain discrete devices Smart cards are well-known in the art of information security as inexpensive, portable devices for storing and transporting secure information. The electronic circuitry, which is embedded in such a card and functions as a data-storage device, has a finite thickness. This thickness of the circuitry is determined by the technology used. The circuitry is typically a few hundred microns thick Clearly, the thickness of the card must be slightly more than the thickness of the embedded circuitry.

When a user has to carry only a small number of cards, the thickness of each card is not particularly important in terms of the volume that the cards occupy in his/her wallet. However, as the cost of the electronics decreases and the storage capacity increases, the ability and need to stack a larger number of cards in one pile becomes more of a problem because the cards occupy more wallet space A U.S. patent application Ser. No. 11/444,385 of Raz Dan, filed on Jun. 1, 2006, and assigned to the assignee of the present invention, entitled "A Business Card Comprising a Digital Memory" teaches a standard-size business card that contains a USB Flash Drive (UFD). Such a card enables a user to carry tens of cards; for example, for handing out in a conference or in a meeting. In such a scenario, the thickness of the card increases the volume of the stack, and limits the number of cards that can be carried comfortably.

It would be desirable if the total thickness of a stack of cards, having embedded electronic circuitry, could be significantly less than the sum of the thicknesses of the individual cards.

SUMMARY OF THE INVENTION

For the purpose of clarity, the following are definitions of several terms that are specifically defined for use within the context of this patent application The term "device" is defined in this application to refer to a component that includes electronic circuitry or a connector (e.g. a USB connector).. The terms "properly aligned" and "proper alignment registry" are defined in this application to refer to two or more similarly-sized cards stacked on top of each other such that their respective edges and apertures are in registry with each other. The term "densely packed" is defined in this application to refer to a stack of cards in which the gap between each pair of neighboring cards is less than the thickness of a single card. The term "attaching" is defined in this application to refer to mounting a device on or within a card.

The term "smart card" is used in this application to refer to a card containing embedded electronic circuitry. However, it is intended that the term "smart card" also includes a general card, meant for stacking, having features of the present invention as well.

It is the purpose of the present invention to provide systems and methods for a smart card with embedded electronic circuitry, and for reducing the thickness of a stack of smart cards that contain discrete devices.

The innovative aspect of the present invention lies in that the thickness of a stack of such smart cards can be reduced to a quarter of the thickness of a comparable stack of prior-art standard cards, thereby reducing the volume the stack occupies.

The present invention is based on the fact that the surface area occupied by the electronic circuitry of such a smart card is much smaller than the surface area of a standard card. Thus, the smart card can be made much thinner than the electronic circuitry, while having apertures in the smart card that allow the circuitry of one card to protrude through the apertures of other cards when stacked in a pile.

Therefore, according to the present invention, there is provided for the first time a system including: (a) a first card bearing at least one device; and (b) a second card having at least one aperture that is configured to allow at least one device to be inserted into at least one aperture when the second card is properly aligned with the first card, thereby allowing at least one device to protrude into at least one aperture.

Preferably, the first card includes at least one aperture, and wherein the second card includes at least one device, so that at least one aperture of the first card accommodates at least one device of the second card when the first card is properly aligned with the second card.

Most preferably, the apertures and the devices are configured to allow a stack of a plurality of the first and second cards to be densely packed.

Preferably, at least one of the cards includes a magnetic stripe.

Preferably, at least one device includes an electronic circuit

Preferably, the first card includes at least one embedded electrically-conductive wire for operationally connecting at least one device to a connector.

Preferably, at least one device is positioned at a periphery of the first card

Preferably, at least one device is positioned in an enclosed region of the first card.

Preferably, at least one aperture is positioned at a periphery of the second card.

Preferably, at least one aperture is positioned in an enclosed region of the second card.

Preferably, the first card includes at least two different types of the devices.

Preferably, at least one device is configured to protrude through at least one aperture.

According to the present invention, there is provided for the first time a method for porting devices, the method including the steps of: (a) providing cards that are at most about two-thirds as thick as the thickest device; (b) attaching the devices to respective cards; (c) creating apertures in the cards, wherein the apertures are located in proper alignment registry with the devices; and (d) stacking the cards in such a way that the devices protrude into the apertures in adjacent cards in a stack of the cards.

Preferably, the step of providing the cards includes configuring the cards with respective thicknesses such that the devices protrude through the apertures in adjacent cards in a stack of the cards.

Preferably, the step of providing the cards includes configuring the cards to be at most about one-half as thick as the thickest device.

Preferably, the step of providing the cards includes configuring the cards to be at most about one-quarter as thick as the thickest device.

These and further embodiments will be apparent from the detailed description and examples that follow.

BRIEF DESCRIPTION OF THE DRAWINGS

The present invention is herein described, by way of example only, with reference to the accompanying drawings, wherein:

FIG. 2A shows a side view of a partial cross-section through the apertures, of a stack of the smart cards, shown in FIG. 1;

FIG. 2B shows an alternate arrangement of the stack of smart cards shown in FIG. 2A;

FIG. 2C shows an alternate arrangement of the stack of smart cards shown in FIG. 2A;

FIG. 2D shows an alternate arrangement of the stack of smart cards shown in FIG. 2A;

DESCRIPTION OF THE PREFERRED EMBODIMENTS

The present invention relates to systems and methods for a smart card with embedded electronic circuitry. The principles and operation for a smart card with embedded electronic circuitry, according to the present invention, may be better understood with reference to the accompanying description and the drawings.

Figure 1:
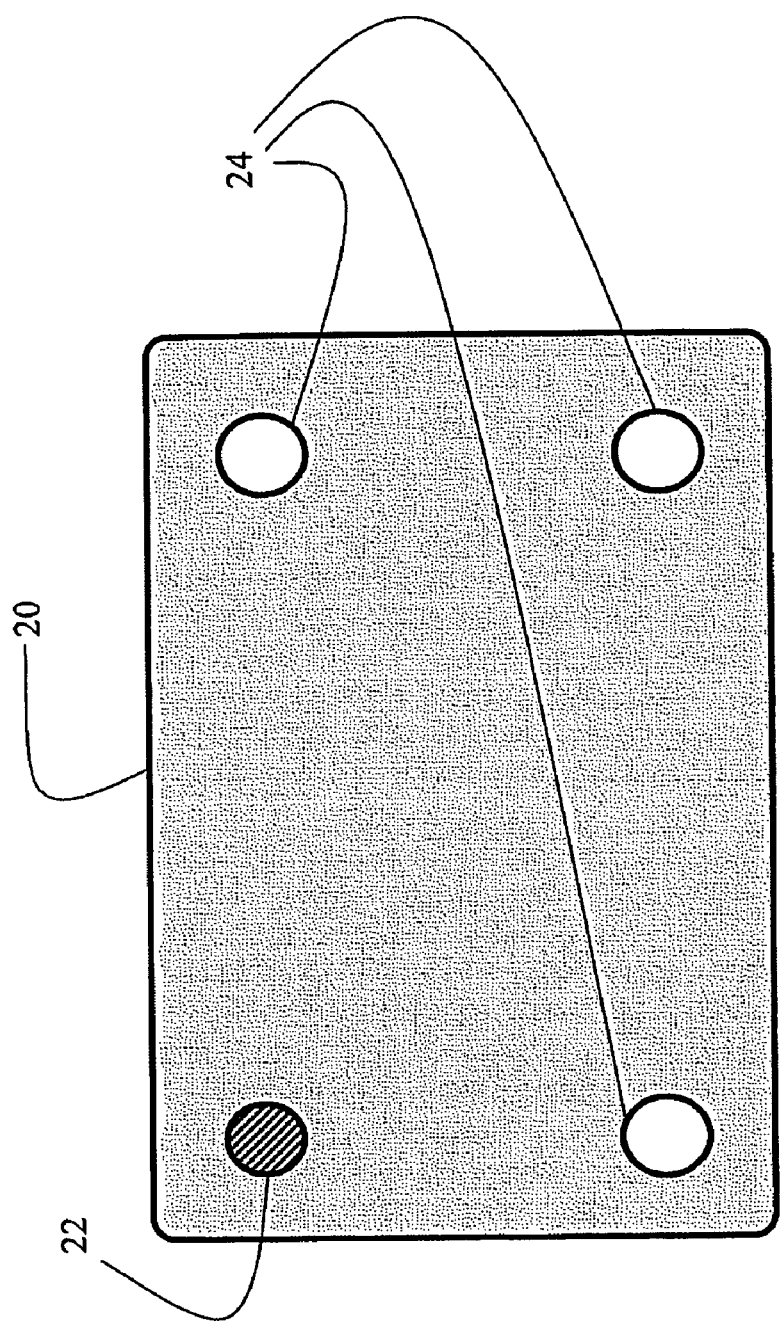
FIG. 1 shows a top view of a smart card, according to a preferred embodiment of the present invention.

Referring now to the drawings, FIG. 1 shows a top view of a smart card, according to a preferred embodiment of the present invention. A card 20 is shown in FIG. 1, similar to a conventional card. In a preferred embodiment of this invention, an active device 22, which is significantly thicker than card 20, is located near a corner of card 20. Three apertures 24, having diameters slightly larger than the diameter of device 22, are located near the remaining three corners of card 20 at the same distance from the respective corners as device 22 is from its respective corner.

The present invention also includes the stacking of cards on top of each other, where the height of device 22 is slightly less than four times the thickness of card 20. Two cards 20 can be placed on top of each other so that device 22 of the lower card protrudes through an unoccupied aperture 24 of the upper card. A third card can be placed underneath the two cards with device 22 of the third card protruding through another unoccupied aperture 24. Finally, a fourth card can be placed underneath the three cards with device 22 of the fourth card protruding through the last unoccupied aperture 24 When this arrangement is completed, the stack of cards 20 is substantially rigid, and all apertures 24 are filled by the protruding devices 22 of the cards 20. A similar arrangement is described in detail in FIGS. 2A-2D.

FIGS. 2A-2D show side views of a partial cross-section through the apertures, of a stack of 12 smart cards of the type shown in FIG. 1. Each of FIGS. 2A-2D shows the stack in a different arrangement. Various shadings are used in FIG. 2A-2D to differentiate individual cards 30-52. The reference numerals are shown only in FIG. 2A, but cards having the same elevation and shading have the same reference numerals in all four Figures. In FIG. 2A, card 36 is shown with a device 54 protruding through three additional cards (30, 32, and 34). Similarly, cards 44 and 52 have device that protrude through the stack. In FIG. 2B, card 50 is shown with a device 56 protruding through card 52. In FIG. 2C, card 32 is shown with a device 58 protruding through card 30. In FIG. 2D, card 46 is shown with a device 60 protruding through cards 48, 50, and 52

Each of the four arrangements of the stack shown in FIGS. 2A-2D can be further stacked on top of itself indefinitely. The result will be a pile of cards that is as thick as the sum of the thicknesses of the cards, while each card contains a device that is almost four times thicker than the thickness of a single card. The present invention enables the stacking of N cards of thickness X, carrying a device of thickness Y, in a pile that is approximately N*X thick, rather than N*Y thick. As Y can be almost four times X, the present invention saves as much as 75% from the amount of material needed, and the thickness of the pile.

Figure 3:
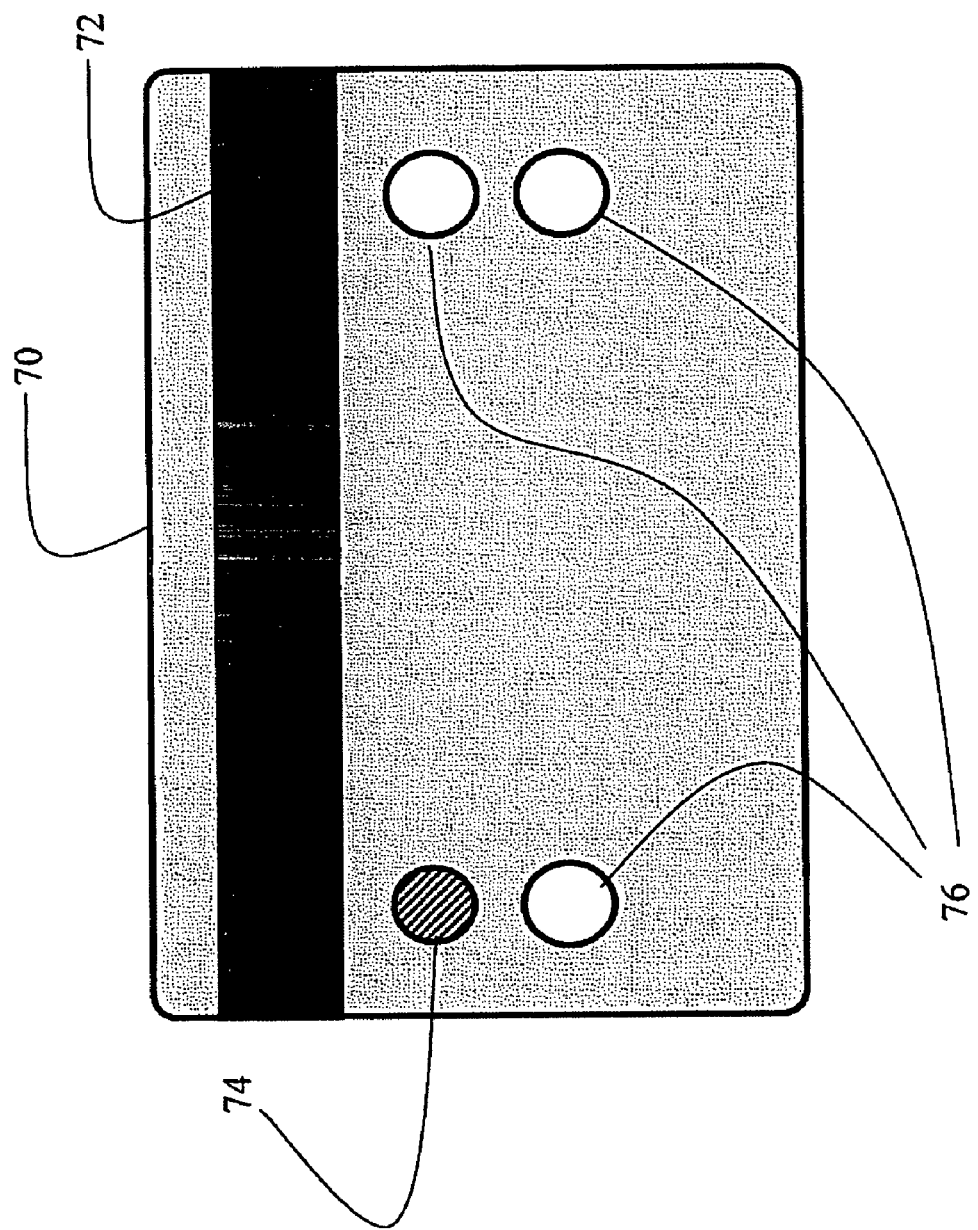
FIG. 3 shows an active smart card that includes a device, according to a preferred embodiment of the present invention.

FIG. 3 shows an active smart card that includes a device, according to a preferred embodiment of the present invention. A card 70 has a magnetic stripe 72 for storing magnetically-recorded information, and for reading the information by a magnetic-card reader (not shown). A device 74 and apertures 76 are located close to the shorter sides of card 70, so that device 74 does not interfere with magnetic stripe 72 or with the reading mechanism of a magnetic-card reader.

Figure 4:
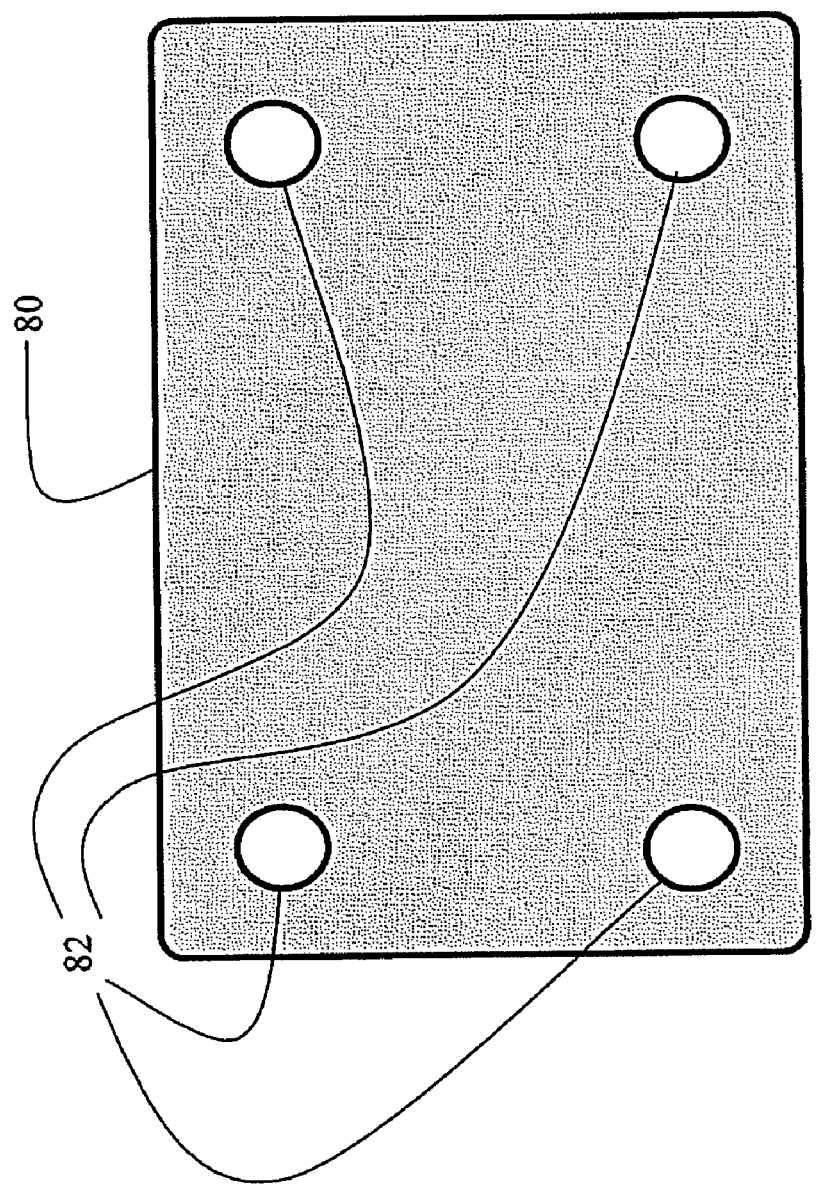
FIG. 4 shows a passive smart card that does not include a device, according to a preferred embodiment of the present invention.

FIG. 4 shows a passive smart card that does not include a device, according to a preferred embodiment of the present invention. A passive card 80 having an arrangement of apertures 82 similar to the smart card of FIG. 1 is shown. The difference between active card 20 of FIG. 1 and passive card 80 of FIG. 4 is that device 22 of FIG. 1 is replaced by an additional aperture 82, making the number of apertures 82 is one greater than in the active card of FIG. 1. Passive card 80 can be placed on the top or on the bottom of a pack of active cards 20, so that the devices of active cards 20 that extend through the pack are protected by passive cards 80. For purposes of shipping, storing, and transporting in a wallet, the overall shape of the pack fits conveniently in a box with no protrusions. To avoid any protruding devices, a user carries passive cards 80 in his/her wallet. Passive cards 80 can additionally include useful printed information and/or advertisements.

Figure 5:
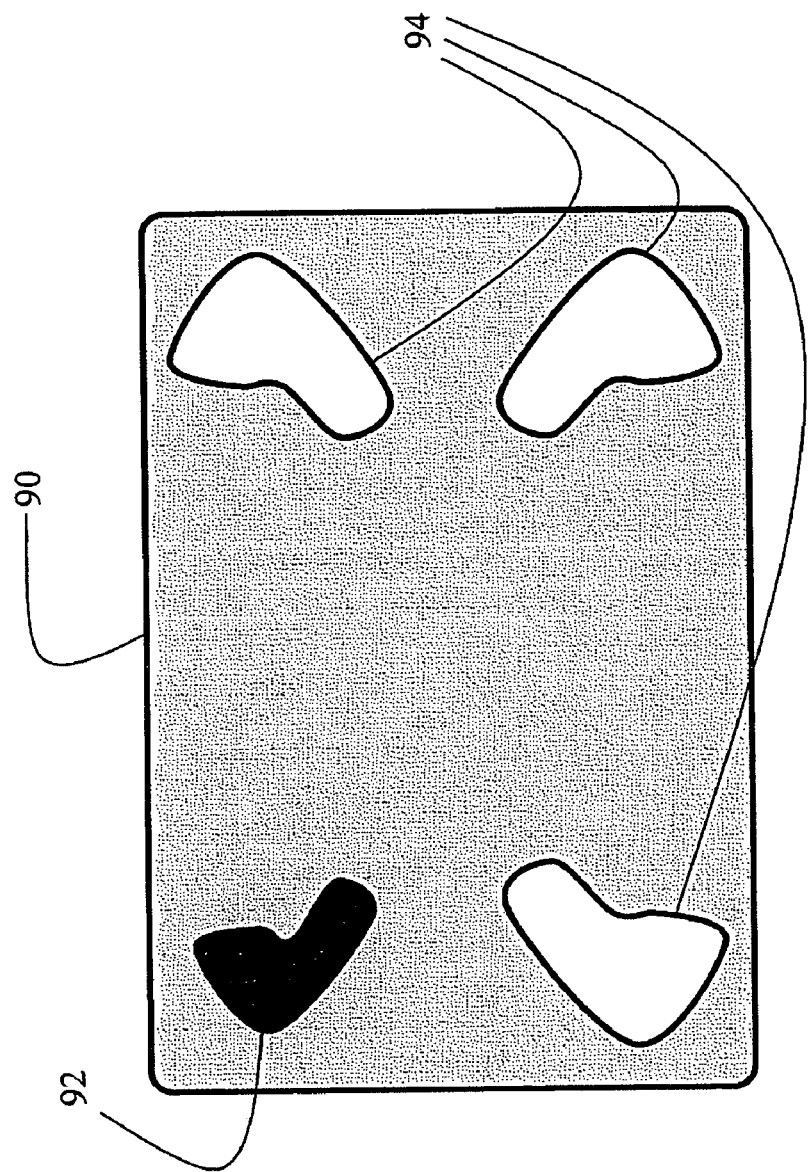
FIG. 5 shows a smart card, with a device, having apertures that are neither round nor symmetric, according to a preferred embodiment of the present invention.

FIG. 5 shows a smart card, with a device, having apertures that are neither round nor symmetric, according to a preferred embodiment of the present invention. A card 90, having a device 92 and apertures 94, is shown similar to the smart card of FIG. 1, with the exception that device 92 and apertures 94 are neither round nor symmetric. This preferred embodiment allows for a wide range of shapes for the device and apertures.

Figure 6:
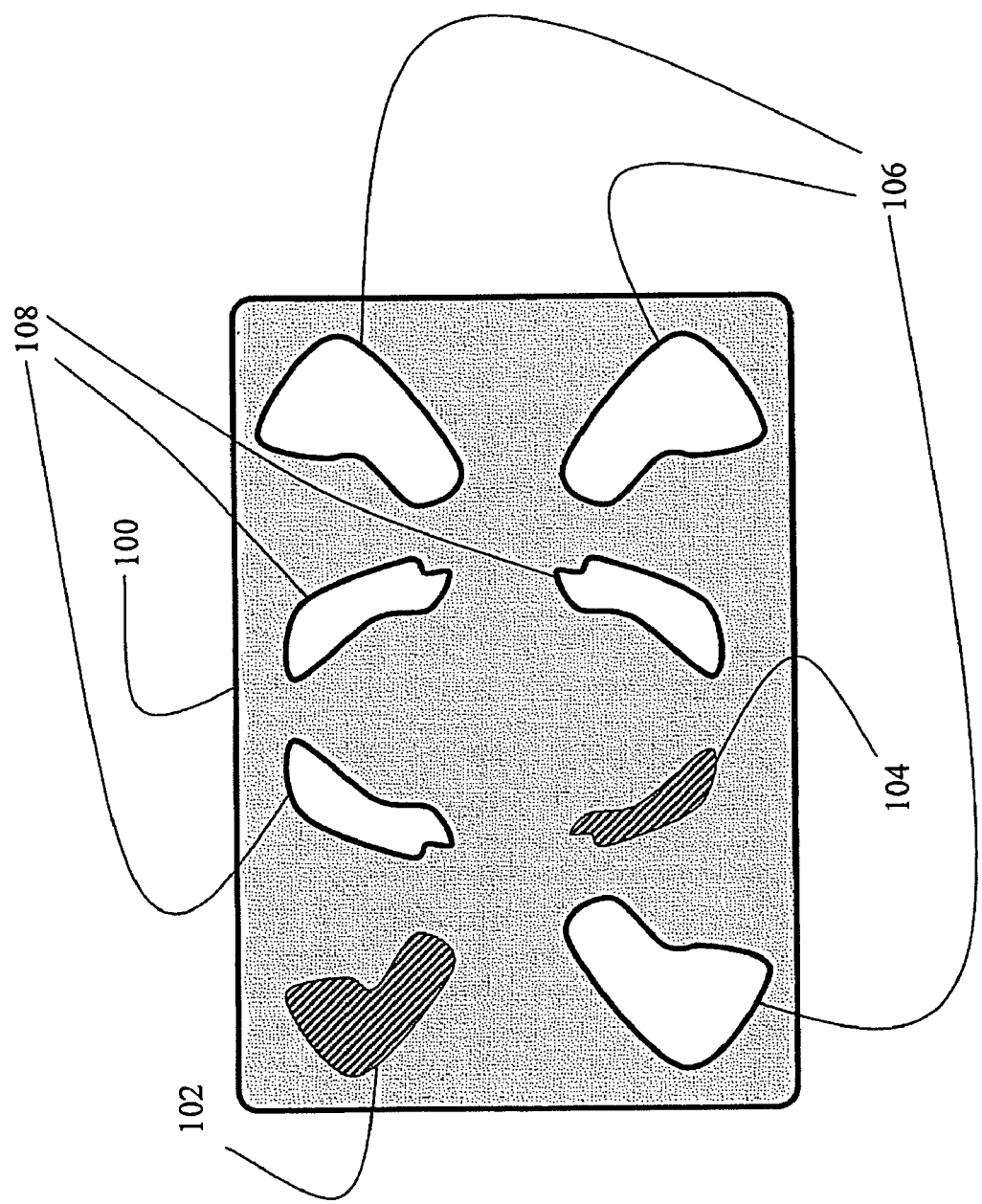
FIG. 6 shows a smart card with two discrete devices, according to a preferred embodiment of the present invention.

FIG. 6 shows a smart card with two discrete devices, according to a preferred embodiment of the present invention. A card 100, having two discrete devices 102 and 104, is shown. Device 102 can be inserted into apertures 106 of another card 100; whereas, device 104 can be inserted into apertures 108 of another card 100, according to the present invention This preferred embodiment allows for multiple devices to be installed on the card, as long as the total area of the devices is smaller than the total area of the apertures needed to contain the devices, and allows the cards to be stacked compactly.

Figure 7:
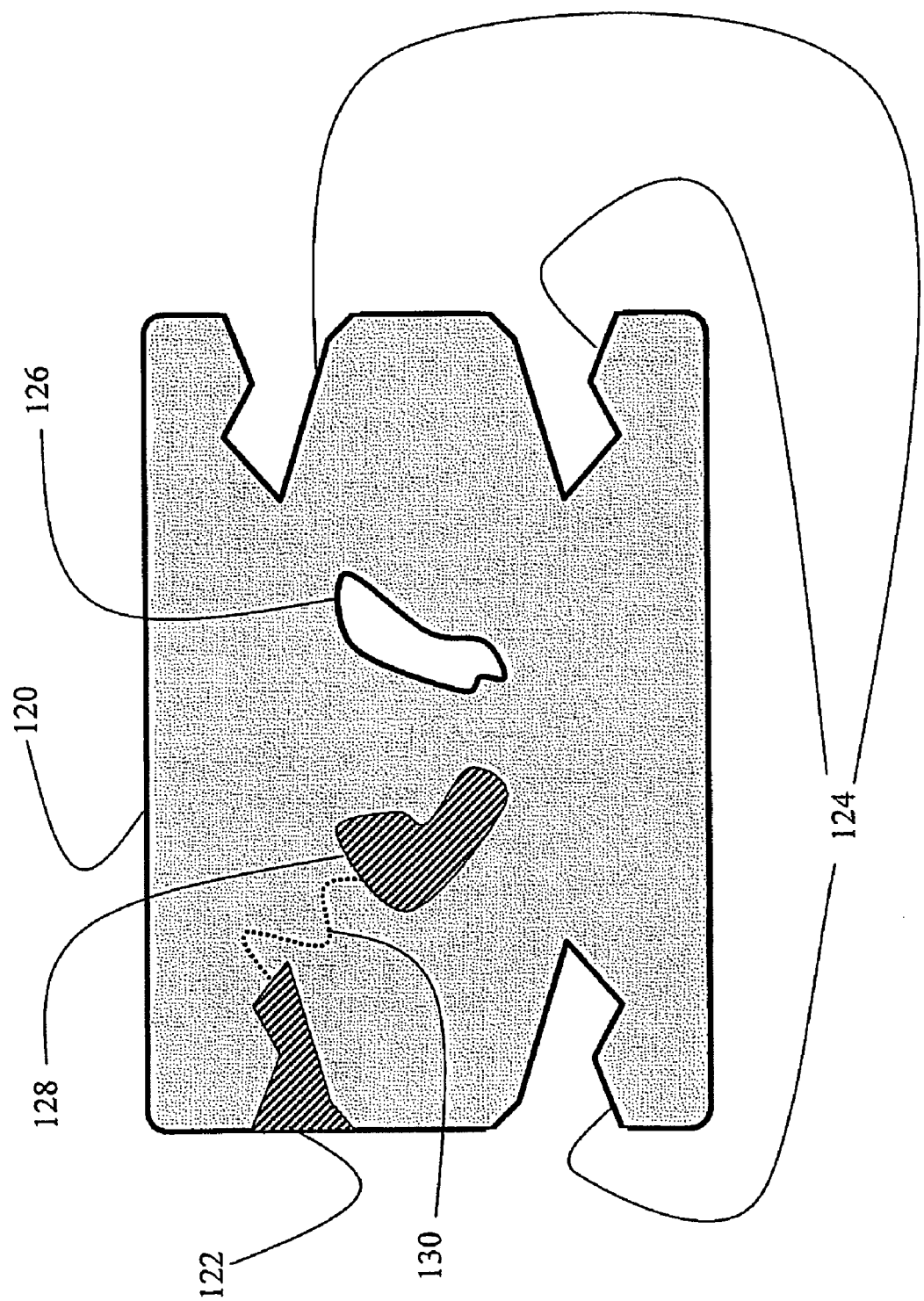
FIG. 7 shows a smart card, with a device that extends to the periphery of the card, having apertures that are semi-enclosed, according to a preferred embodiment of the present invention.

FIG. 7 shows a smart card, with a device that extends to the periphery of the card, having apertures that are semi-enclosed, according to a preferred embodiment of the present invention. A card 120 having a semi-enclosed device 122 that extends to the periphery of card 120. Semi-enclosed device 122 can be inserted into semi-enclosed apertures 124 of another card 120, according to the present invention.

Optionally, this embodiment includes an enclosed aperture 126 and an enclosed device 128, similar to apertures 108 and device 102 of FIG. 6, respectively. Semi-enclosed device 122 can be connected to enclosed device 128 via a wire 130 embedded in card 120. Devices such as semi-enclosed device 122 are very useful in serving as connector ports for electronic devices, such as USB connectors. The thickness of such connectors is often determined by industry standards and by the dimensions of the mating sockets. In the prior art, the thickness of a card has to be increased beyond general necessity simply to accommodate a standard connector. It is noted again that the term "aperture" in this application refers to both closed and open apertures.

The functionality of the device in the present invention is limited only by the imagination of device designers. The device can be, among other functional components, an electronic circuit, a battery, a storage box, an embossed text or graphics, a connector, a socket, a roll of wire, and an antenna, for example.

While the invention has been described with respect to a limited number of embodiments, it will be appreciated that many variations, modifications, and other applications of the invention may be made.

What is claimed is:

1. A system comprising:
    (a) a first card bearing at least one device, wherein said at least one device includes electronic circuitry; and
    (b) a second card having at least one aperture that is configured to accommodate said at least one device when said first card is stacked onto said second card and said second card is properly aligned with said first card, so as to allow said at least one device to protrude into said at least one aperture;
   wherein said first card is configured to be electrically isolated from said second card when said cards are stacked and properly aligned with each other.

2. The system of claim 1, wherein said first card includes at least one aperture, and wherein said second card includes at least one device, so that said at least one aperture of said first card accommodates said at least one device of said second card when said first card is properly aligned with said second card.

3. The system of claim 2, wherein said apertures and said devices are configured to allow a stack of a plurality of said first and second cards to be densely packed.

4. The system of claim 1, wherein at least one of said cards includes a magnetic stripe.

5. The system of claim 1, wherein said first card includes at least one embedded electrically-conductive wire for operationally connecting said at least one device to a connector.

6. The system of claim 1, wherein said at least one device is positioned at a periphery of said first card.

7. The system of claim 1, wherein said at least one device is positioned in an enclosed region of said first card.

8. The system of claim 1, wherein said at least one aperture is positioned at a periphery of said second card.

9. The system of claim 1, wherein said at least one aperture is positioned in an enclosed region of said second card.

10. The system of claim 1, wherein said first card includes at least two different types of said devices.

11. The system of claim 1, wherein said at least one device is configured to protrude though said at least one aperture.

12. The system of claim 1, wherein said first card includes at least two apertures, and wherein said second card includes at least two apertures and at least one device.

13. The system of claim 1, wherein said first card includes at least three apertures, and wherein said second card includes at least three apertures and at least one device.

14. The system of claim 13, wherein said devices and said apertures of said first card and said second card are approximately positioned symmetrically around a horizontal median of said cards, a vertical median of said cards, and a center point of said cards.

15. A method of making cards with devices, the method comprising the steps of:
    (a) providing cards with devices such that each of the cards is at most about two-thirds as thick as the thickest device;
    (b) attaching the devices to respective cards; and
    (c) creating apertures respectively in the cards, so that said apertures are located in proper alignment registry with the devices when the cards are aligned for stacking and wherein the cards are electrically isolated from each other when the cards are stacked and properly aligned with each other.

16. The method of claim 15, wherein said step of providing the cards includes configuring said cards with respective thicknesses such that the devices protrude through said apertures in adjacent cards in a stack of the cards.

17. The method of claim 15, wherein said step of providing the cards includes configuring said cards to be at most about one-half as thick as the thickest device.

18. The method of claim 15, wherein said step of providing the cards includes configuring said cards to he at most about one-quarter as thick as the thickest device.

19. A system comprising:
    (a) a first card bearing at least one device; and
    (b) a second card having at least one aperture that is configured to accommodate said at least one device when said first card is stacked onto said second card and said second card is properly aligned with said first card, so as to allow said at least one device to protrude into said at least one aperture;
   wherein said cards are at most about two-thirds as thick as said at least one device, and wherein said first card is configured to be electrically isolated from said second card when said cards are stacked and properly aligned with each other.

20. The system of claim 19, wherein said first card includes at least one aperture, and wherein said second card includes at least one device, so that said at least one aperture of said first card accommodates said at least one device of said second card when said first card is properly aligned with said second card.

21. The system of claim 20, wherein said apertures and said devices are configured to allow a stack of a plurality of said first and second cards to be densely packed.

22. The system of claim 19, wherein at least one of said cards includes a magnetic stripe.

23. The system of claim 19, wherein said at least one device includes electronic circuitry.

24. The system of claim 19, wherein said first card includes at least one embedded electrically-conductive wire for operationally connecting said at least one device to a connector.

25. The system of claim 19, wherein said at least one device is positioned at a periphery of said first card.

26. The system of claim 19, wherein said at least one device is positioned in an enclosed region of said first card.

27. The system of claim 19, wherein said at least one aperture is positioned at a periphery of said second card.

28. The system of claim 19, wherein said at least one aperture is positioned in an enclosed region of said second card.

29. The system of claim 19, wherein said first card includes at least two different types of said devices.

30. The system of claim 19, wherein said at least one device is configured to protrude through said at least one aperture.

31. A system comprising:
   (a) a first card bearing at least one device, wherein said at least one device includes a USB connector; and
   (b) a second card having at least one aperture that is configured to accommodate said at least one device when said first card is stacked onto said second card and said second card is properly aligned with said first card, so as to allow said at least one device to protrude into said at least one aperture;

wherein said first card is configured to be electrically isolated from said second card when said cards are stacked and properly aligned with each other.

32. The system of claim 31, wherein said first card includes at least one aperture, and wherein said second card includes at least one device, so that said at least one aperture of said first card accommodates said at least one device of said second card when said first card is properly aligned with said second card.

33. The system of claim 32, wherein said apertures and said devices are configured to allow a stack of a plurality of said first and second cards to be densely packed.

34. The system of claim 31, wherein at least one of said cards includes a magnetic stripe.

35. The system of claim 31, wherein said first card includes at least one embedded electrically-conductive wire for operationally connecting said at least one device to a connector.

36. The system of claim 31, wherein said at least one device is positioned at a periphery of said first card.

37. The system of claim 31, wherein said at least one device is positioned in an enclosed region of said first card.

38. The system of claim 31, wherein said at least one aperture is positioned at a periphery of said second card.

39. The system of claim 31, wherein said at least one aperture is positioned in an enclosed region of said second card.

40. The system of claim 31, wherein said first card includes at least two different types of said devices.

41. The system of claim 31, wherein said at least one device is configured to protrude though said at least one aperture.

* * * * *

UNITED STATES PATENT AND TRADEMARK OFFICE
CERTIFICATE OF CORRECTION

| | | |
|---|---|---|
| PATENT NO. | : 7,401,733 B2 | Page 1 of 1 |
| APPLICATION NO. | : 11/530911 | |
| DATED | : July 22, 2008 | |
| INVENTOR(S) | : Itzhak Pomerantz | |

It is certified that error appears in the above-identified patent and that said Letters Patent is hereby corrected as shown below:

Claim 11, column 6 should be corrected as follows:

Line 2: correct "though" to read --through--

Claim 18, column 6 should be corrected as follows:

Line 34: correct "he" to read --be--

Signed and Sealed this

Sixteenth Day of September, 2008

JON W. DUDAS
*Director of the United States Patent and Trademark Office*